United States Patent [19]

Frutiger

[11] 4,162,762
[45] Jul. 31, 1979

[54] DATA PROCESSING MACHINE, ESPECIALLY CIPHERING EQUIPMENT

[76] Inventor: Peter Frutiger, Sonnhalde 18, Wangen, Switzerland

[21] Appl. No.: 847,788

[22] Filed: Nov. 2, 1977

[30] Foreign Application Priority Data

Nov. 10, 1976 [CH] Switzerland ............... 14162/76

[51] Int. Cl.² .............. G06K 7/10; G06K 21/04; H04L 15/12
[52] U.S. Cl. .................... 235/461; 235/489; 235/458; 250/570; 178/17 B
[58] Field of Search ............ 250/563, 569, 570; 235/489, 476, 477, 481, 458, 461; 178/17 B

[56] References Cited

U.S. PATENT DOCUMENTS

| | | | |
|---|---|---|---|
| 3,207,845 | 9/1965 | Swenson | 250/570 |
| 3,461,305 | 8/1969 | Moulton | 250/570 |
| 3,883,723 | 5/1975 | Lukstas | 178/17 B |

Primary Examiner—Robert M. Kilgore
Attorney, Agent, or Firm—Ostrolenk, Faber, Gerb & Soffen

[57] ABSTRACT

A data processing machine, especially ciphering equipment, comprising an input device for the entering of data to be processed. The input device comprises a perforated tape reader containing a scanner unit for scanning standardized teleprinter perforated tapes which possess a number of parallel information tracks formed by information perforations and a feed track formed by feed perforations. The information perforations have a different diameter than the feed perforations. The scanner unit or device is connected with a circuit which, based upon the signals received from the scanner device, determines which of the scanned tracks constitute the information tracks and which the feed track.

7 Claims, 6 Drawing Figures

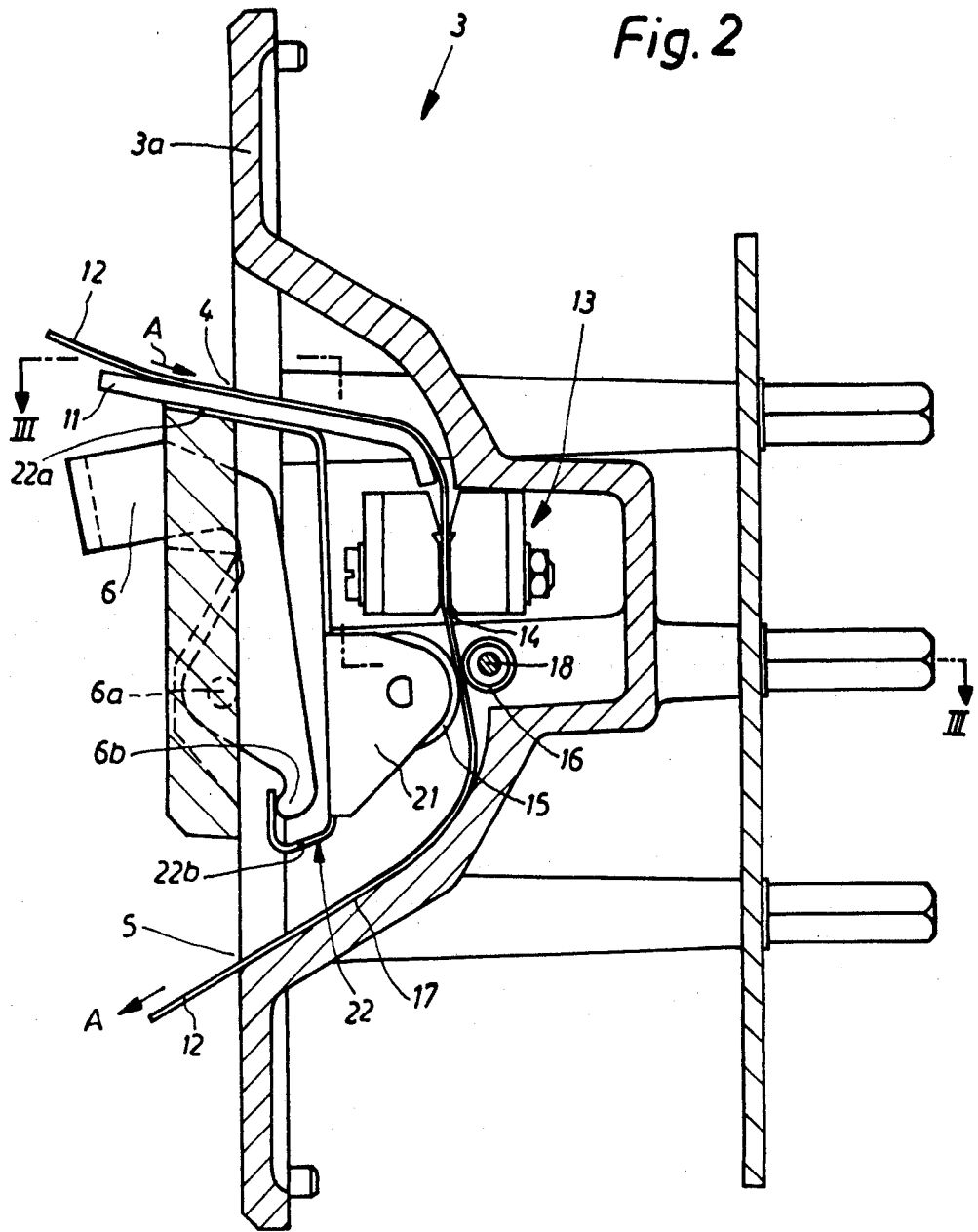

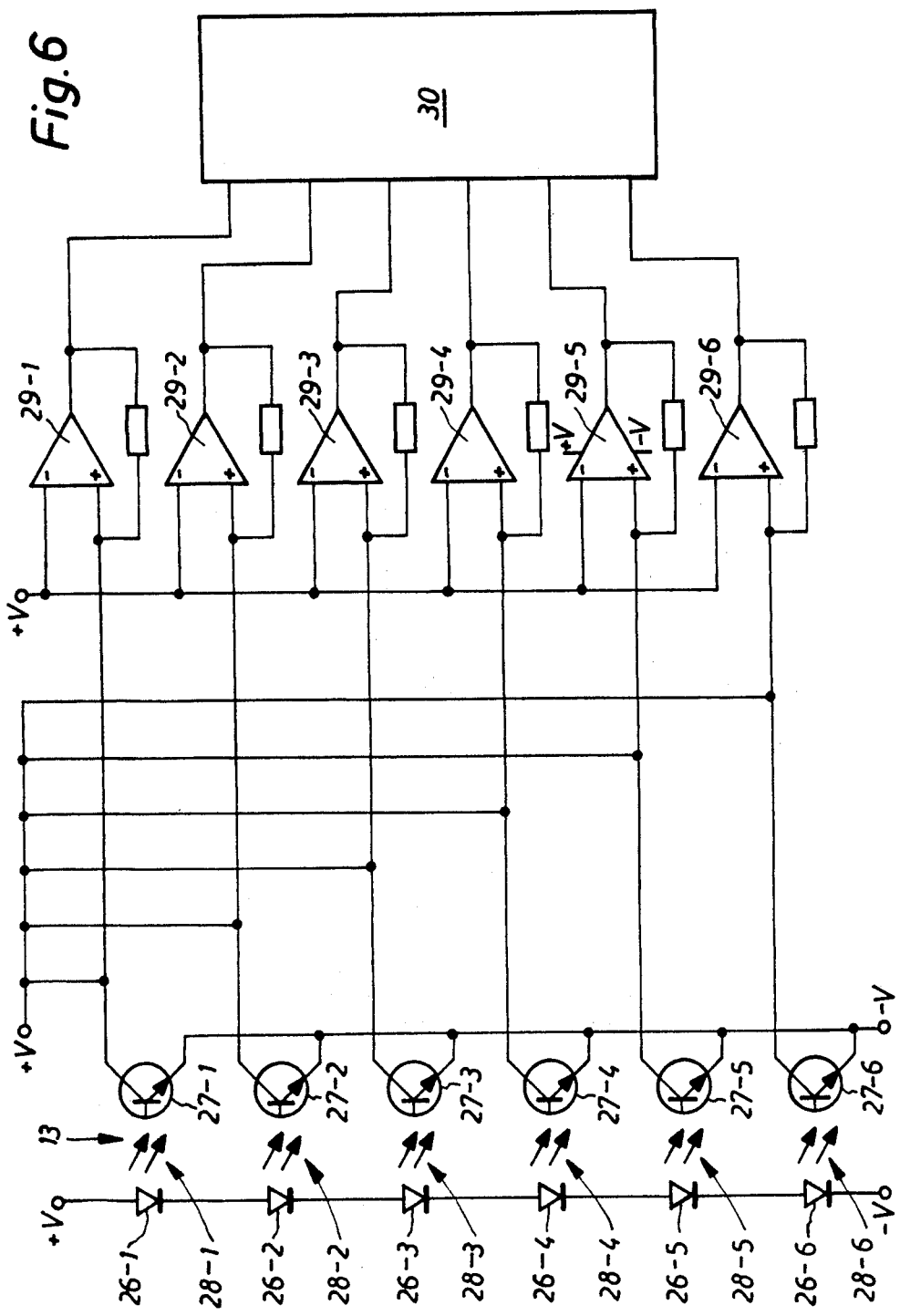

DATA PROCESSING MACHINE, ESPECIALLY CIPHERING EQUIPMENT

BACKGROUND OF THE INVENTION

The present invention relates to a new and improved construction of a data processing machine or data processor, especially ciphering equipment, comprising an input device for the entering of data which is to be processed. As used herein, the term "data processing machine" or "data processor" should be understood to also constituting ciphering equipment, i.e., deciphering and enciphering devices.

It is known to convert a plain text into a secret text in accordance with a Key which should remain secret for unauthorized persons. The Basic Key which is to be inserted into the enciphering device and deciphering device is periodically changed. Care must be taken to prevent third parties from improperly gaining knowledge of the Basic Key information. By resorting to suitable measures it is possible to extinguish the already inserted Basic Key information. However, it must also be insured that the Basic Key, before and during the input into the device, cannot come into the hands of unauthorized individuals. If the operator memorizes the Basic Key, then the secrecy of the Key information is substantially guaranteed. In the case of complicated Basic Keys, however, it is not possible to memorize the desired Key information. As a result, it is necessary to retain the Key information upon a record medium. The record medium must not, however, fall into the hands of unauthorized individuals. When altering the Basic Key it is necessary to enter the new Basic Key information to all cipher devices of the network. It is therefore imperative that the record medium together with the Basic Key information is available at all devices of the network.

SUMMARY OF THE INVENTION

It is a primary object of the present invention to provide a new and improved construction of data processing machine which is not associated with the aforementioned drawbacks and limitations of the prior art proposals.

Another and more specific object of the invention relates to providing a data processing machine, especially a ciphering device, of the previously mentioned type, wherein the input device is structured for the rapid processing of record mediums which can be easily destroyed and, additionally, can be provided at any time and without having to resort to complicated measures with the data which is to be entered.

In order to achieve these and still further objects of the invention, which will become more readily apparent from the following description, the input device of the present invention comprises a perforated tape reader which contains a scanner unit or device for scanning standardized teleprinter perforated tapes which possess a number of essentially parallel information tracks formed by information perforations or holes and a feed track formed by feed perforations or holes. The information perforations have a different diameter than the feed perforations. The scanner unit is connected with a circuit which, based upon the signals received from the scanner unit, determines which of the scanned tracks constitute the information tracks and which the feed track.

By virtue of the fact that the input device constitutes a perforated tape reader for processing standardized teleprinter perforated tapes, it is possible to produce the perforated tapes with the data to be entered without difficulty at any teleprinter or also with the aid of manual perforators. The perforated tape reader which is provided at the equipment of the invention is not designed to process perforated tapes other than standard teleprinter perforated tapes or even perforated or punched cards.

BRIEF DESCRIPTION OF THE DRAWINGS

The invention will be better understood and objects other than those set forth above, will become apparent when consideration is given to the following description thereof. Such description makes reference to the annexed drawings wherein:

FIG. 2 illustrates in longitudinal sectional view, taken along the line II—II of FIG. 3, the perforated tape reader;

FIG. 6 is a circuit diagram of the opto-electrical perforated tape reader.

DETAILED DESCRIPTION OF THE PREFERRED EMBODIMENTS

Figure 1:
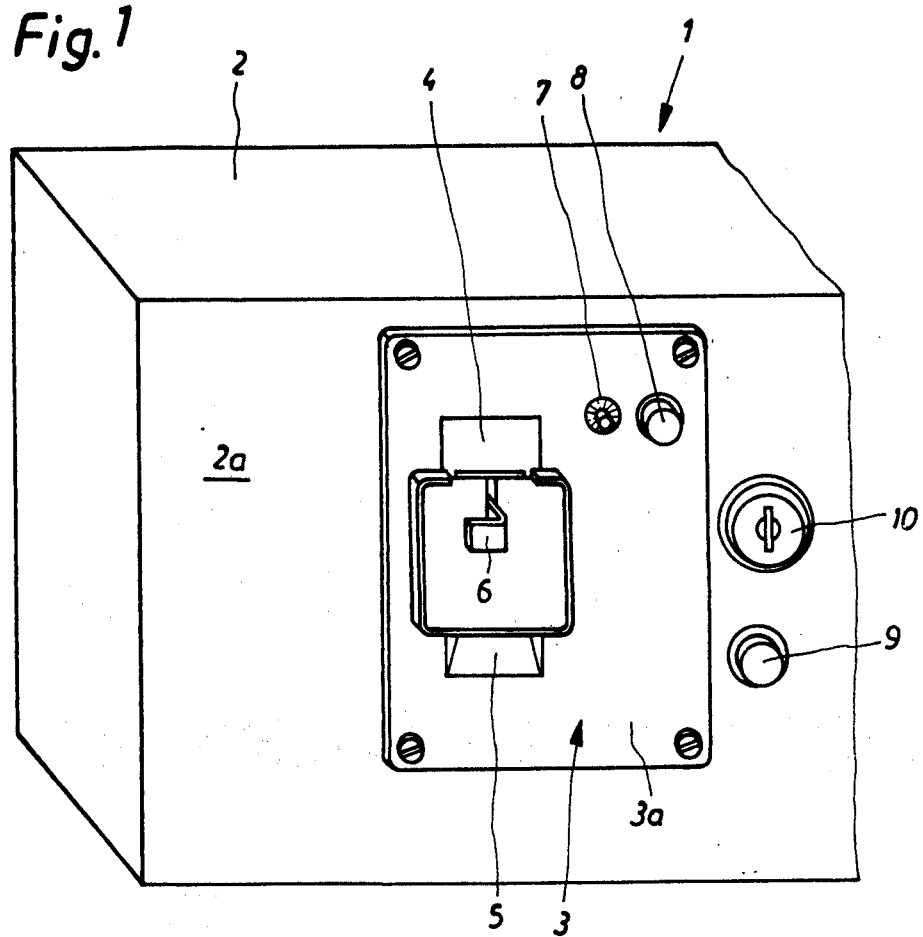
FIG. 1 is a schematic perspective view of part of a ciphering device or equipment provided with a perforated tape reader.

Referring now to the drawings, there is illustrated in FIG. 1 a perspective view of part of an enciphering device or deciphering device, which is designated hereinafter generally as ciphering device 1. The electronic components, which have not been further illustrated, are conventionally accommodated in a housing 2. Apart from further not particularly illustrated operating elements and display elements (switches, lamps and the like) and cable connections there is attached to the front plate 2a of the housing 2 a perforated tape reader 3. This perforated tape reader 3 possesses a baseplate 3a having an inlet opening 4 and an outlet opening 5 for a standardized 5-level teleprinter perforated tape, such as the tape 12 shown in FIG. 2. A lever 6 is provided and must be actuated in order to insert the perforated tape. An indicator or display lamp 7, two pushbuttons 8 and 9 or equivalent structure and a key-actuated switch 10 are also provided.

The perforated tape is read and the read data in stored an intermediate store arranged internally of the housing 2 responsive to actuation of pushbutton 8. During this time, lamp 7 is illuminated. Upon actuation of the switch 10 the information stored in the aforementioned intermediate store or memory, i.e. the Basic Key, is transmitted to a primary or main store. The information which was stored in the intermediate and main is extinguished responsive to depression of pushbutton 9.

Figure 3:
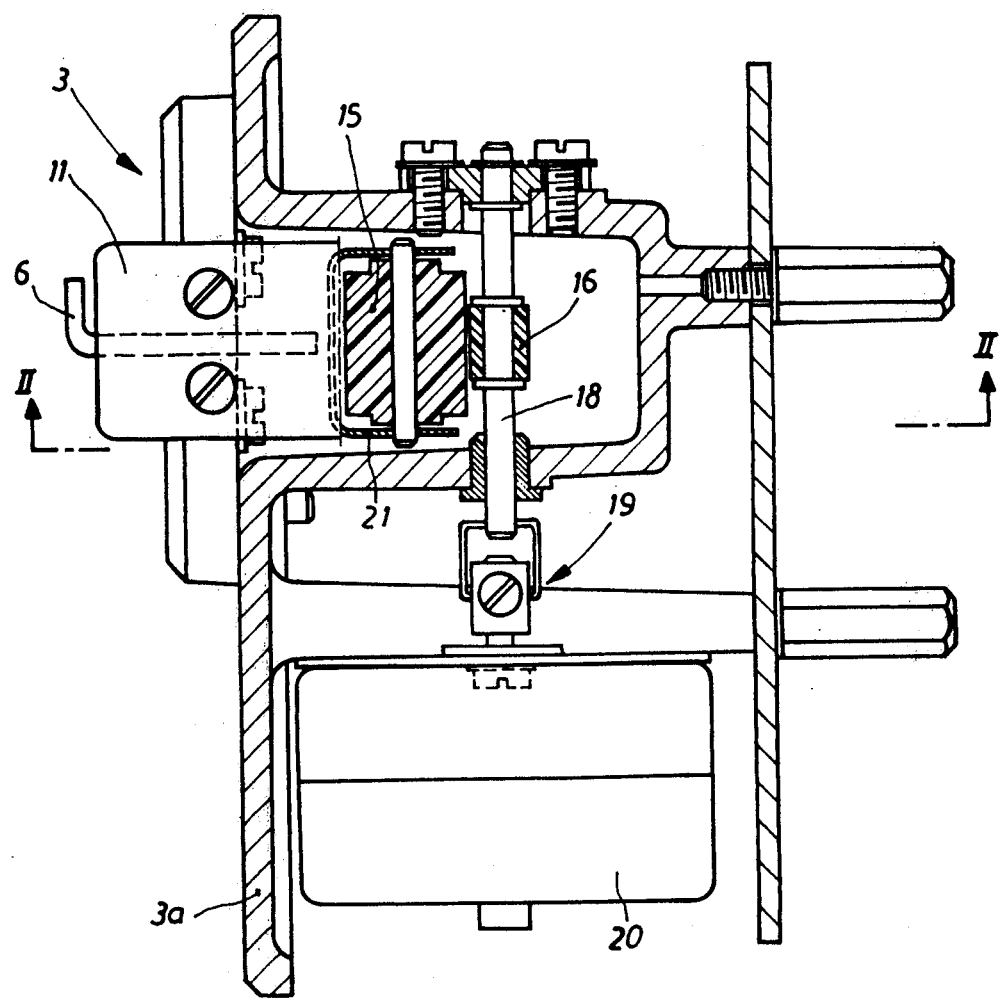
FIG. 3 is a cross-sectional view of the arrangement of FIG. 2, taken substantially along the line III—III thereof.

Referring now to FIGS. 2 and 3, the perforated tape reader 3 together with its most important parts is shown schematically. At the inlet opening 4 there is arranged a guide plate 11 upon which bears the perforated tape 12 and feeds the perforated tape 12 to an opto-electrical reader or reader unit 13 which is shown schematically in FIG. 2 and will be described in greater detail hereinafter. The perforated tape 12 travels through a gap 14 in the reader 13 to two friction wheels 15 and 16 which serve to advance the tape 12. After leaving the friction wheels 15 and 16, the perforated tape 12 contacts at a guide track 17 which guides the perforated tape 12 to the outlet opening 5.

As illustrated in FIG. 3, friction wheel 16 is seated upon a shaft 18 which is mounted to both sides of the friction wheel 16. The shaft 18 is drivingly connected by means of a coupling 19 with a stepping motor 20. Stepping motor 20 receives drive pulses from a conventional and therefore not particularly illustrated drive circuit.

The other friction wheel 15, which functions as a idler roller, is rotatably mounted in a holder or support 21. Holder 21 is attached to an attachment component or element 22, adjust end 22a of which is fixedly connected to front plate 2a, the second end 22b of which is rotatably freely movable. The lever 6 is mounted to shaft 6a. The end 6b of lever 6 acts upon the free end 22b of the attachment element 22. As a result of the spring-elastic properties of the attachment element 22 the friction wheel 15, and thus the perforated tape 12, are pressed against the stationary friction wheel 16. The perforated tape 12 which travels between both of the friction wheels 15 and 16 (friction wheel 16 being driven), is advanced in the direction of the arrow A due to the frictional forces which are effective between the perforated tape 12 and the friction wheels 15 and 16.

In order to insert the perforated tape 12, the lever 6 is depressed thereby rotating about the shaft 6a.

As a result, end 6B of lever 6 presses against end 22b of attachment element 22. Element 22 is elastically deflected causing friction wheel 15 to lift from friction wheel 16. The perforated tape 12 can now be introduced, whereafter the lever 6 is again released, so that the attachment element 22 returns to its initial position with friction wheel 15 pressing against the friction wheel 16.

Figure 5:
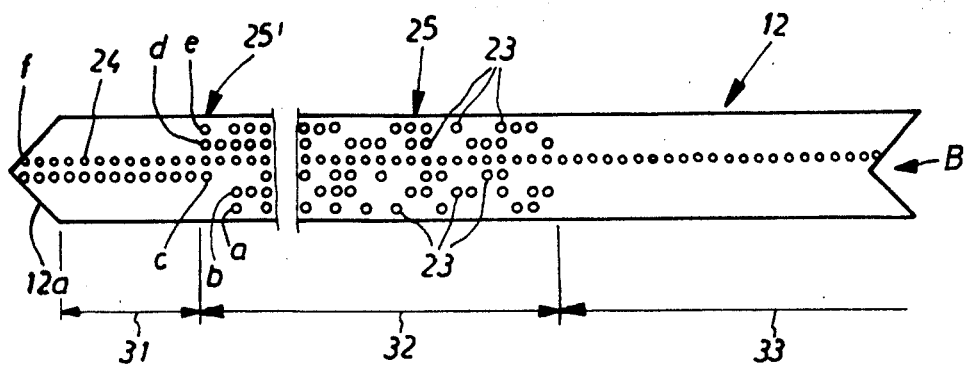
FIG. 5 is plan view of a standardized teleprinter perforated tape.

As already mentioned, the perforated tape reader or scanner unit 3 is structured such that it only can process standard 5-level teleprinter perforated tapes. In FIG. 5 there is illustrated one such standardized perforated tape 12. The perforated tape illustrated in FIG. 5 corresponds to DIN-standard 66016 (German Industrial Standard) and possesses five parallel information tracks a, b, c, d, and e and a feed track f which is oriented essentially parallel to the aforementioned information tracks. The information perforations or holes 23 which form the information tracks have a longer diameter than the diameter of the feed holes 24 forming the feed track. The information and feed holes 23, 24 which in each case form a row 25 extending transversely with respect to the feed direction B of the perforated tape 12 are simultaneously scanned by means of the opto-electronic reader or reader device 13.

However, it is possible to construct the perforated tape reader 3 such that it can process other standardized or standard teleprinter perforated tapes which also have more than five information tracks. Thus, for instance, it is also possible to employ perforated tape readers 3 which are capable of processing perforated tapes which correspond to the standard for perforated tapes which are furnished by ECMA (European Computer Manufacturers Association).

Figure 4:
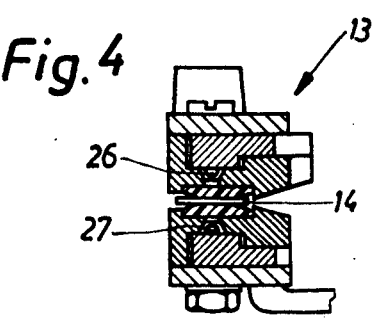
FIG. 4 is a sectional view through the opto-electrical reader unit of the perforated tape reader.

Referring now to FIG. 4 there is illustrated a sectional view if the opto-electronic reader 13 which serves to read the information tracks and the feed tracks of the perforated tape 12. The reader 13 comprises adjacently situated light barriers positioned transversely with respect to the feed direction A of the perforated tape 12. The number of such light barriers corresponds to the number of tracks appearing at the perforated tape 12. Each light barrier comprises a light transmitter 26, for instance a light-emitting diode, and a light receiver 27, for instance a photodiode. The light receiver 27 is located opposite the light transmitter 26 with respect to the gap 14 through which the perforated tape 12 is guided.

In FIG. 6 there is shown a schematic circuit diagram of the perforated tape reader 3. Since with the illustrated exemplary embodiment the perforated tape 12 possesses a total of six tracks, there are provided at the reader 13 six light barriers 28-1, 28-2, 28-3, 28-4, 28-5 and 28-6, each of which is provided with a light-emitting diode 26-1, 26-2, 26-3, 26-4, 26-5, 26-6 and a photodiode 27-1, 27-2, 27-3, 27-4, 27-5, 27-6. The not particularly referenced output of each photodiode 27-1, 27-2, 27-3, 27-4, 27-5, 27-6 is connected with a related amplifier 29-1, 29-2, 29-3, 29-4, 29-5, 29-6, respectively, which amplifies the output signals of the associated photodiode and delivers such to a not further illustrated circuit 30 which processes these amplified output signals.

If the perforated tape 12 is drawn through the opto-electrical reader or reader device 13, then both the information perforations 23 as well as the feed perforations 24 are scanned photo-electrically. The cycle speed is determined by scanning the feed perforations or holes. The signals obtained by scanning the information perforations 23 are processed by the circuit 30 and the information scanned from the perforated tape is stored in the previously mentioned intermediate store or memory.

Since the cycle is governed by scanning the feed perforation row f, it is possible, in the case of failure of the drive motor 20 for the friction wheel 16, to manually draw the perforated tape 12 through the opto-electrical reader 13, without there arising difficulties during scanning of the perforated tape and during the correct evaluation of the perforated tape information.

As shown in FIG. 5, the perforated tape 12 possesses at the front end 12a a leading section 31, which, apart from the feed perforation row f, only possesses an information perforation row C. The main section 32 follows the leading section 31 and carries the actual key information. In this section, all information tracks a, b, c, d, and e possess information perforations 23 in accordance with the employed code. Following the main section 32 is a terminal or end section 33 at which includes only the feed perforation row f.

Leading section 31 of the perforated tape 12 makes is possible to introduce the perforated tape 12 into the inlet opening 4 without having to take any particular care with respect to the proper alignment of the perforated tape. The circuit 30 monitors the leading section 31 which travels through the reader 13 and determines when the first perforated row 25' (containing the key information) has arrived. After this point, the scanned information is stored in the intermediate storage.

The circuit 30, during its monitoring of the leading section 31, further determines which track is the feed track f and which track is the information track c. This is possible because, as already mentioned, the information perforations 23 have a larger diameter than the diameter of the feed perforations 24. Hence, the quantity of light received by the photodiodes 27 is of different magnitude. The circuit 30 can now determine which tracks are the information tracks a, b, c, d, and e. Consequently, it is possible to properly evaluate of the information tracks a, b, c, d, and e at the section 32, irrespective of which side of tape 12 is fed face up to the perforated tape reader 3.

By virtue of the fact that the perforated tape scanner 3 can process standard teleprinter perforated tapes, it is possible to produce such perforated tapes at any random teleprinter or by means of a manual perforator such as are available on the market resembling an 8 mm movie camera, or by hole-by-hole perforators, available as "correcting tools". When producing a perforated tape it is therefore possible to resort to the use of existing, widely employed devices and the operator is not limited to the use of special equipment which is available only at specific locations. This is of special significance when a new perforated tape must be procured with the new Basic Key information for ciphering devices, since the ciphering devices usually are located in the field and all ciphering devices in the same network must be equipped with the new Basic Key. Additionally, when necessary, a perforated tape can be easily destroyed, which is highly advantageous if the perforated tape carries the secret Basic Key information.

While there are shown and described present preferred embodiments of the invention, it is to be distinctly understood that the invention is not limited thereto, but may be otherwise variously embodied and practiced within the scope of the following claims.

What is claimed is:

1. A perforated tape reader comprising:
   a scanner adapted to scan teleprinter perforated tapes having a number of essentially parallel information tracks formed by information perforations and a feed track formed by feed perforations, said feed track being essentially parallel to said information tracks, the size of said information perforations being different than the size of said feed perforations, said scanner being adapted to generate output signals indicative of the relative magnitude of each of said perforations as said perforations pass said scanner;
   means for advancing said perforated tape past said scanner; and
   circuit means responsive to said output signals for determining which of said scanned tracks constitute said information tracks and which of said scanned tracks constitutes said feed track as a function of the size of said information and feed perforations.

2. The tape reader of claim 1 wherein said scanner comprises a photoelectric scanning unit for scanning both said information and said feed track.

3. The tape reader of claim 2 wherein said photoelectric scanner unit comprises a plurality of individual photoelectric detector means equal in number to the total number of said information in feed tracks, each of said photoelectric detector means adapted to sense the presence or absence of a perforation in a respective one of said information and feed tracks as said perforated tape is advanced past said photoelectric detector means and to generate an output signal representative of the size of each perforation as it passes said photoelectric detector means.

4. The tape reader of claim 1 wherein said perforated tape includes a main section on which both said information tracks and said feed tracks are formed and a leading section on which said feed tracks and only one of said information tracks is formed and wherein said circuit means, upon scanning of said leading section, determines which tracks in said main section constitutes said information tracks.

5. The tape reader of claim 1 wherein said means for advancing said perforated tape comprises:
   a pair of friction wheels having friction surfaces which are biased against each other and between which said perforated tape may travel;
   drive means for driving one of said friction wheels.

6. The data processor as defined in claim 1, wherein said driven friction wheel is stationarily arranged, and wherein said drive means comprises:
   a stepping motor drivingly connected with said driven friction wheel; and
   means for displacing the other of said friction wheels out of contact with said driven friction wheel in order to permit said perforated tape to be introduced therebetween.

7. The tape reader of claim 3 further including means for determining the cycle speed as a function of the speed at which said feed track passes said scanner.

* * * * *